(12) United States Patent
Ebling et al.

(10) Patent No.: US 9,418,300 B2
(45) Date of Patent: Aug. 16, 2016

(54) DEVICE, METHOD, AND COMPUTER FOR IMAGE-BASED COUNTING OF OBJECTS PASSING THROUGH A COUNTING SECTION IN A SPECIFIED DIRECTION

(75) Inventors: Julia Ebling, Hildesheim (DE); Christof Krueger, Munich (DE); Jan Karl Warzelhan, Bad Salzdefurth Ot Heinde (DE)

(73) Assignee: Robert Bosch GmbH, Stuttgart (DE)

( * ) Notice: Subject to any disclaimer, the term of this patent is extended or adjusted under 35 U.S.C. 154(b) by 1348 days.

(21) Appl. No.: 12/922,229

(22) PCT Filed: Nov. 20, 2009

(86) PCT No.: PCT/EP2009/065516
§ 371 (c)(1),
(2), (4) Date: Sep. 13, 2010

(87) PCT Pub. No.: WO2010/081577
PCT Pub. Date: Jul. 22, 2010

(65) Prior Publication Data
US 2011/0037852 A1  Feb. 17, 2011

(30) Foreign Application Priority Data
Jan. 13, 2009 (DE) .......................... 10 2009 000 173

(51) Int. Cl.
*G06K 9/00* (2006.01)
(52) U.S. Cl.
CPC .................................. *G06K 9/00778* (2013.01)
(58) Field of Classification Search
CPC ...................... G06K 9/00778; G08B 13/19602
See application file for complete search history.

(56) References Cited

U.S. PATENT DOCUMENTS 4,249,207 A   2/1981   Harman et al.
5,465,115 A * 11/1995  Conrad et al. ................ 348/155
(Continued)

FOREIGN PATENT DOCUMENTS

DE   10 2006 053 286   5/2008
DE   10 2007 031 302   1/2009
(Continued)

*Primary Examiner* — Joseph Ustaris
*Assistant Examiner* — Zhubing Ren
(74) *Attorney, Agent, or Firm* — Michael J. Striker

(57) ABSTRACT

For operators of public or commercial buildings, such as supermarkets, it is interesting to determine how many persons, in particular potential buyers, enter the building each day. In other areas, as well, entering and exiting moving objects are counted: it is typical, for example, that cars driving into and out of a parking garage are counted. The invention relates to a device 1 for counting objects in a monitoring area, having a counting module 9, wherein the counting module comprises an object counter increasing by one counting value when one of the objects completely passes through a counting section 6 in a counting direction 4 as a counting object, having at least one monitoring camera 2 for capturing the monitoring area, wherein the monitoring camera 2 is designed for outputting an image data stream of the monitoring area, and having an extraction module 10 designed for extracting moving image areas in a current image of the image data flow, wherein the moving image areas can represent the objects or partial segments thereof, wherein the counting module 9 is designed for increasing the object counter 9 by a partial value for each current image for one of the moving image areas 3, the direction of motion thereof corresponding to the counting direction 4 and thus representing a potential counting object or a partial segment thereof, said partial value being less than the counting value.

9 Claims, 2 Drawing Sheets

(56) References Cited

U.S. PATENT DOCUMENTS

Figure 1:
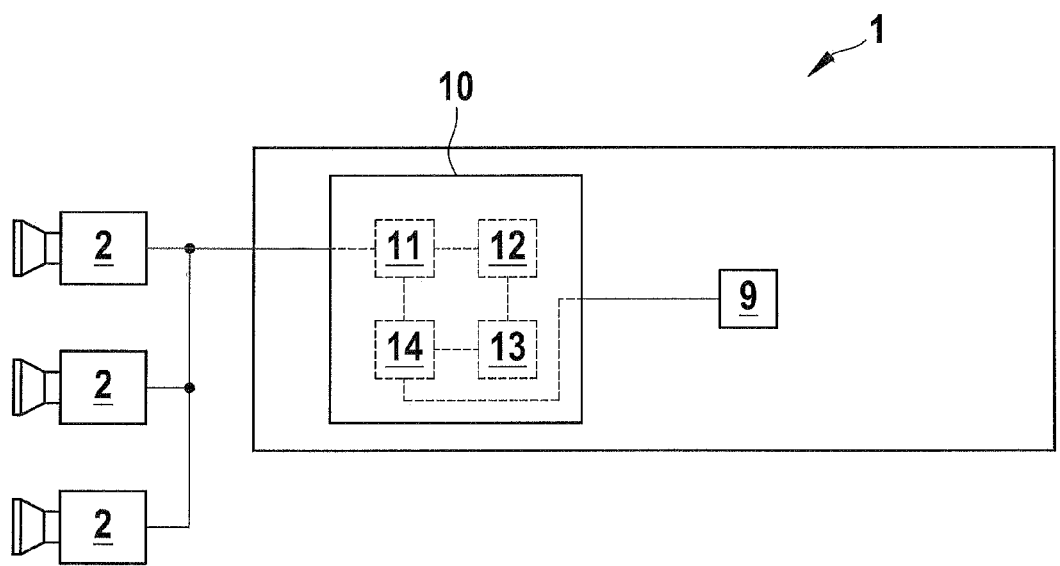

| | | | |
|---|---|---|---|
| 5,574,762 A * | 11/1996 | Sato et al. | 377/6 |
| 5,946,368 A * | 8/1999 | Beezley | 377/6 |
| 7,303,475 B2 * | 12/2007 | Britt et al. | 463/42 |
| 2003/0053658 A1 * | 3/2003 | Pavlidis | 382/103 |
| 2003/0053659 A1 * | 3/2003 | Pavlidis et al. | 382/103 |
| 2008/0112595 A1 | 5/2008 | Loos | |
| 2008/0212099 A1 * | 9/2008 | Chen | 356/408 |
| 2009/0245573 A1 * | 10/2009 | Saptharishi et al. | 382/103 |
| 2009/0268024 A1 * | 10/2009 | Tsukuda et al. | 348/143 |
| 2009/0296989 A1 * | 12/2009 | Ramesh et al. | 382/103 |
| 2010/0071010 A1 * | 3/2010 | Elnathan et al. | 725/81 |
| 2010/0177936 A1 | 7/2010 | Ebling et al. | |

FOREIGN PATENT DOCUMENTS

| | | |
|---|---|---|
| EP | 0 700 017 | 3/1996 |
| GB | 2 337 146 | 11/1999 |

* cited by examiner

DEVICE, METHOD, AND COMPUTER FOR IMAGE-BASED COUNTING OF OBJECTS PASSING THROUGH A COUNTING SECTION IN A SPECIFIED DIRECTION

BACKGROUND INFORMATION

The invention relates to a device for counting objects in a surveillance region, comprising a counting module, wherein the counting module includes an object counter that is increased by one counting value on average when one of the objects, as the object to be counted, completely passes through a counting section in a counting direction, and including at least one surveillance camera for recording the surveillance region, wherein the surveillance camera is designed to output an image data stream of the surveillance region, and including an extraction module designed to extract moving image regions in a current image from the image data flow, and wherein the moving image regions can represent the objects or segments thereof. The invention also relates to a method for counting objects, and to a computer program.

For operators of public or commercial buildings, such as supermarkets, it is interesting to determine how many persons, in particular potential buyers, enter the building each day. In other areas as well, entering and exiting moving objects are counted: It is typical, for example, to count cars that drive into and out of a parking garage.

Depending on the area of application, various devices for counting have become common: In the case of the parking garage, for instance, it is possible to record the cars using contactless inductance measurement. In supermarkets, on the other hand, buyers can be counted using simple light barriers that trigger a counter when they are interrupted. In the case of the aforementioned procedures, however, only individual moving objects can be detected, and these measurement methods cannot be used to determine the direction of the moving object. A further weakness of the light-barrier method is that the light barrier can be blocked by stationary objects.

It likewise appears possible to count moving objects using video surveillance systems. Video surveillance systems of that type typically comprise a plurality of cameras that are directed to a surveillance region, wherein the image data streams from the cameras are combined in a surveillance center to be monitored manually or in an automated manner. It is possible, for instance, to track moving objects for a certain period of time, wherein the number of tracked objects represents a count of these moving objects. The video surveillance systems function at their best when the moving objects can be well delineated from each other. In contrast, for video-based surveillance methods, this means that the objects in the camera image should not overlap or be situated too closely to each other. Erroneous evaluations can occur when scenes are densely populated in particular since moving objects can overlap as described above.

Publication DE 10 2006 053 286 A1, which is the closest prior art, describes a method for detecting image regions of salient motion, wherein a current optical flow field in an image sequence is calculated and compared with a reference flow field that includes the main directions of flow of image regions of the depicted scene, wherein a counter-flow field having motion vectors of image regions of salient motion is formed from image regions of the scene, the motion vectors of which are not oriented in the main flow directions.

DISCLOSURE OF THE INVENTION

Within the scope of the invention, a device having the features of claim 1, a method having the features of claim 11, and a computer program having the features of claim 12 are proposed. Preferred or advantageous embodiments of the invention result from the dependent claims, the description that follows, and the attached figures.

Within the scope of the invention, a device for counting objects in a surveillance region is proposed. The surveillance region can have any design e.g. it can be a public place, an entry to a building, a region inside a building, etc. The device is preferably designed as a video surveillance system.

The device includes a counting module having an object counter, wherein the counting module is designed such that the object counter is increased by one counting value on average when one of the objects, as an object to be counted, completely passes through or has completely passed through a counting section in a counting direction. For example, the counting section is defined by the connection of an entry region and an exit region in a surveillance region. The counting section and/or the counting direction can be defined either in the surrounding region or in image coordinates. By defining the counting direction, it is possible in particular to distinguish between moving objects that move in one direction of the counting section, and moving objects that move in the opposite direction. The counting value, i.e. the increment of the object counter, is preferably 1, and therefore the object counter is increased by the value 1 when an object has completely passed through the counting section in the counting direction.

The device includes at least one surveillance camera which is suitable and/or designed, in particular being disposed, to record the surveillance region, wherein the at least one surveillance camera permits the output of an image data stream of the surveillance region. The image data stream is preferably designed as a sequence of consecutive images. The surveillance camera is preferably designed as a video camera that operates in the visible wavelength range. As an alternative, the surveillance camera can also be realized as a thermal imaging camera or a UV camera. In regards to the optical design, the surveillance camera can deliver a dimensionally accurate image or a distorted image of the surveillance region, and therefore the surveillance camera can also be designed e.g. as a 360° camera or a fisheye camera. The surveillance camera can be disposed e.g. in a "bird's eye view" position, in which case the surveillance camera looks down onto the surveillance region from above, or in a wide angle view position, in which case the surveillance camera is directed onto the surveillance region more from above and the front.

Furthermore, the device includes an extraction module that extracts moving image regions in a current image of the image data stream i.e. image regions that represent objects that move in the surveillance region. The moving regions are preferably identified by comparing the current image with one or more previous images in the image data stream. In particular, in addition to extracting the moving image regions, motion data on the image regions and, therefore, the objects assigned to the image regions, are ascertained.

According to the invention, the counting module is designed to increase the object counter by a partial value for each current image that was processed by the extraction module for one of the moving image regions, the direction of motion thereof corresponding to the counting direction and thus representing a potential object to be counted or a segment thereof, the partial value being less than the counting value.

The object counter is therefore increased on an image-by-image basis by only a fraction of the counting value when the analysis of the current image reveals that an object, as the object to be counted, moves along the counting section in the counting direction.

Instead of the classical approach to image processing, in which an object is detected and tracked for a certain period of time and, therefore, across a sequence of images, and to subsequently determine whether this object has passed through the counting section in the counting direction, a new approach is implemented according to the invention. In crowded scenes in particular, the object can be assigned incorrectly, or the object can disappear while it is being tracked. To rule out these potential sources of error, it is provided according to the invention that the evaluation is carried out on an image-by-image basis, wherein the object counter is increased by one partial value as soon as an image region is identified, the assigned object of which represents an object to be counted. Once the object counter is increased by the partial value, the next image is handled as the current image.

For the case in which the object completely passes through the counting section in the counting direction, it should be possible to detect the corresponding image region in each image and to therefore accumulate all of the partial values to form the counting value.

The device also offers particular advantages for the case in which the object becomes lost while it passes through the counting section in the counting direction e.g. because it is covered or it has blended with another object: Without further compensation, this object to be counted is then taken into account, at least partially, as the counting value, and therefore e.g. the counting value 0.8 is registered instead of the counting value 1, and the counting is at least more correct than ignoring the object entirely. As an option, it can be provided that an error of this type is compensated for using statistical means, and therefore the device is designed e.g. to increase the object counter by the counting value 1 in the case of 80% detection. Generally speaking, a correction factor is optionally applied to the partial value, which compensates for errors resulting from an object being covered and/or blended with other objects. Although this approach does not result in an exact count, it does deliver a highly reliable and stable statistical statement regarding the number of counted objects.

This systematically occurring deviation is preferably corrected using an off-line and/or on-line calibration, wherein the correction factor is derived in advance for off-line calibration based on "ground truth" data i.e. image sequences for which the exact number of persons in the counting direction is known. In on-line calibration, this correction factor can be adaptively adjusted by also applying an additional tracking module.

Possible advantages of the invention are that objects can be counted from any feasible camera position, and that the device can also be used successfully in densely populated scenes such as train stations, airports, or other public places.

In a preferred development of the invention, the extraction module includes a flow module that is designed to determine an optical flow field having flow vectors. The optical flow is preferably identified by comparing the current image with one or more previous images in the image data stream, and generates a vector field, wherein a displacement vector and/or a velocity vector, which describes the relative displacement of the image contents of the pixel relative to one or more preceding images, is assigned to each pixel. Image regions having flow vectors that have no noteworthy length should therefore be evaluated as images of stationary elements in the surveillance region. Image regions having larger flow vectors relate to moving objects in the surveillance region that can represent potential objects to be counted.

Particularly preferably, the counting module is designed to sum a partial value for each new and/or updated flow field that includes an image region, the assigned direction of motion of which is identical to the counting direction, and/or represents a possible object to be counted. This embodiment once more underscores the inventive idea of evaluating the image data flow on an image-by-image basis. It is preferably provided that the objects to be counted—at least within the scope of evaluation by the counting module—are non-individualized and/or untracked and/or anonymized and/or handled.

According to a preferred development of the invention, a subsection of the counting section that the corresponding object to be counted has covered in the current image as compared to a previous image is estimated depending on the direction of motion or velocity of the moving image region or the corresponding object to be counted.

Within the scope of the invention, it is optionally possible to define the counting direction as well as a tolerance range for the counting direction since it is assumed that the objects to be counted do not move exactly parallel to the counting direction. However, objects to be counted that are located in the tolerance range cover a longer distance than the length of the counting section. To compensate for possible deviations that result, the subsection that the object to be counted has covered on the counting section is estimated on the basis of the direction of motion and the distance covered. For example, this estimate can be formulated by projecting the flow vectors onto the counting direction and/or the counting path.

According to a preferred development of the invention, the magnitude of the partial value is determined depending on the subsection that was covered—which was determined e.g. via projection onto the counting direction or counting section—and/or depending on the surface area of the subregion. This embodiment is based on the consideration that an object that moves rapidly through the counting section covers a greater distance in the counting section, per image in the image data stream, than does a slowly moving object; the partial value of the rapidly moving object must therefore be greater than that of the slow object in order to obtain the counting value for a complete pass through the counting section.

According to a preferred development of the invention, the device includes a segmenting module which segments the moving image regions and/or the flow regions into object regions. If e.g. the optical flow algorithm that is used does not deliver a dense vector field, the vector field is first compressed and combined using a suitable interpolation method. Segmentation also make it possible to effectively eliminate objects that are too small (e.g. moving leaves or the like) by discarding object regions that fall below a specifiable size.

According to a possible development of the invention, the device includes an object-identification device that is designed to identify the object class of the segmented object regions and/or the moving image regions. An object-identification device of this type can be used to determine whether the particular segmented object region or image region relates to an object that should be counted. In this manner it is possible to specifically count certain objects such as persons with shopping carts instead of persons without shopping carts, and it is possible to exclude erroneous objects.

In possible embodiments, the use of the object-identification device results in a quantity of identified objects, including their position and extension, for the image currently under consideration. The momentary direction of motion and/or velocity of each of these objects can be derived from the optical flow field which was already calculated. The projection of the momentary motion vector onto the counting direction results in a length for each object, the length forming the subsection of the counting section.

A further subject of the invention relates to a method having the features of claim 11 for counting, in particular in a directional manner, objects in a surveillance region; the method is preferably implemented on a device of the type described above, and/or according to one of the preceding claims. Likewise, the device is preferably designed to implement the method according to claim 11. According to the method, moving image regions are extracted from a current image of the surveillance region, and the object counter is increased by a partial value for one of the moving image regions, the direction of motion of which corresponds to the counting direction and thus represents a potential object to be counted or a segment thereof, the partial value being less than the counting value.

A final subject of the invention relates to a computer program which includes program code means having the features of claim 12.

Figure 2:
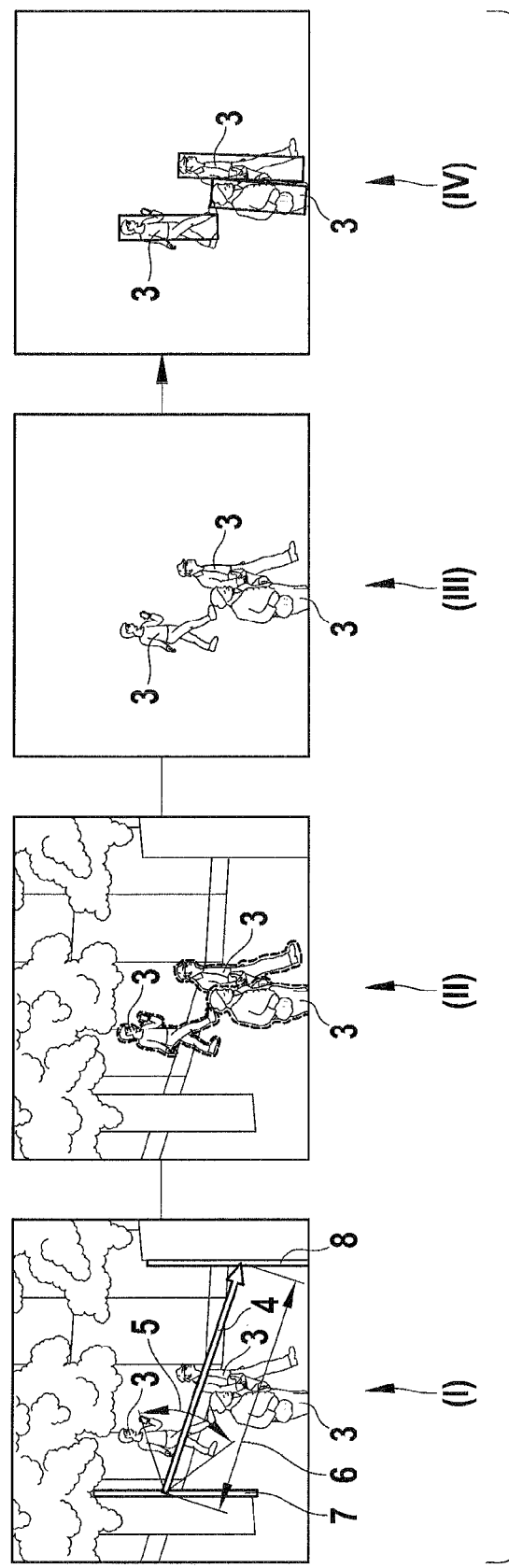

Further features, advantages, and effects of the invention result from the description that follows of a preferred embodiment of the invention, and from the attached figures. They show:

FIG. 1 a schematic block diagram of a device for counting objects, as one embodiment of the invention;

FIG. 2 a camera image from the device according to FIG. 1, in various stages of processing, to illustrate one embodiment of the method according to the invention.

FIG. 1 shows a schematic block diagram of a counting device 1 designed to count moving objects in surveillance regions. Counting device 1 includes one or more surveillance cameras 2 that are directed toward the surveillance region.

In FIG. 2, which shows a camera image, as an example, in various method steps, to illustrate an embodiment of the method according to the invention, (I) depicts a camera image that shows a typical surveillance region which is a street scene in this case. The street scene shows three persons 3 who move from left to right in image (I).

In a first step, the user specifies a counting direction 4, including a tolerance angle 5 and a counting section 6. Counting direction 4, combined with tolerance angle 5, defines the direction persons 3 must move in order to be counted. Counting section 6 states the length, e.g. in image coordinates, that an object or a person 3 must cover from entry into until exiting a region of image (I) in order to be counted. Persons 3 who are present between a scene entry region 7 and a scene exit region 8, and therefore move in counting direction 4, are therefore counted along counting section 6. After one of the persons 3 has completely passed through counting section 6 in correct counting direction 4, the accumulator value of an object counter is increased by one counting value in all, e.g. by the value 1, in a counting module 9 (FIG. 1).

To perform the counting, the current image that was recorded by surveillance camera 2 is transferred to counting device 1, and then moving image regions in the current image are extracted, along with supplemental information on the direction of motion, in an extraction module 10. These moving image regions are enclosed by a dashed line in image (II) shown in FIG. 2, and correspond to persons 3.

One possible embodiment of the extraction of the moving image regions is depicted using dashed lines in FIG. 1. The current image is transferred to a flow module 11 designed to determine the optical flow, using flow vectors, in the current image. If the optical flow algorithm that is used does not deliver a dense vector field, the vector field is first compressed in a segmenting module 12 using a suitable interpolation method. To visualize the results, it is optionally possible to color-code moving image regions, wherein a different shade is assigned to each direction and the brightness represents the length of the flow vector.

In a subsequent step, a binary mask is created, in which those pixels are set that have motion vectors that lie within tolerance angle 5. The original camera image is combined with the binary mask, and therefore only the moving image regions of persons 3 are considered that have a direction of motion that conforms to specified counting direction 4. The result of this step is shown in image (III) in FIG. 2.

In a further step, an object-detection device 13 is used, which indicates for each image position whether a searched-for object is present at this point. The most diverse types of object detectors are feasible e.g. for cars, persons, etc. They can be based on different features, depending on the intended use. When overhead images of a crowd of persons are involved, a head detector is very well suited, for instance, to identify persons. Object-identification device 13 results in a quantity of identified objects, including their position and extension, for the image currently under consideration, as depicted in image (IV) in FIG. 2. The current direction of motion and velocity of each of the objects is now derived from the optical flow field which was already calculated.

By projecting the momentary motion vector of the object onto counting direction 4, a length of the subsection is obtained for each object that, divided by the total length of counting section 6, is summed onto the object counter as a partial value for the current image. In this step, a fraction of the counting value is therefore added, as a partial value, to the accumulator value of the object counter. The subsection or the partial value is estimated in an estimating module 14.

As considered from scene entry 7 to scene exit 8, the image-by-image observations of a single object moving in counting direction 4 increases the accumulator value of the object counter by 1 in all, and therefore the object is counted correctly.

For the case in which statistically occurring errors should be compensated for, a correction value can be calculated that corrects the partial value upward or downward, depending on the statistical errors. In a first possibility, the correction value can be determined using known data. In another possibility, the correction value can be adaptively adjusted by also applying an additional tracking module. For example, it can be provided that the counting device is calibrated during simple scenes.

In summary, the device and the method make it possible to perform directional counting of crowded scenes by calculating the optical flow and, optionally, by using object detectors. The advantage, in particular, is that objects are not tracked from image to image and, instead, image-by-image observations of object motions in the counting direction are summed. An object counter that sums the proportional motion per image in counting direction 4, for each detected object, is used for this purpose.

What is claimed is:

1. A device (1) for counting objects in a surveillance region, comprising
a counting module (9), wherein the counting module includes an object counter that is increased by one counting value, on average, when one of the objects, as the object to be counted, completely passes through a counting section (6) in a counting direction (4), the counting section (6) defining a length that the corresponding object must cover between entering and exiting a region of an image in order to be counted, and at least one surveillance camera (2) for recording the surveillance region, wherein the surveillance camera (2) outputs an image data stream of the surveillance region, an extraction module (10), including a flow module (11) for determining an optical flow field having flow vectors for extracting moving image regions in a current image of the image data stream, wherein the moving image regions Gail-represent the objects or segments thereof, and an estimating module (14) for estimating a subsection of the length that the corresponding object to be counted has covered in the current image depending on the direction of motion or velocity of the corresponding moving image region;

wherein the counting module (9) increases the object counter (9) by a partial value for each current image for one of the moving image regions (3), a direction of motion thereof corresponding to the counting direction (4) and thus representing a potential object to be counted, or a segment thereof, wherein the partial value is less than the counting value, wherein the subsection is estimated by projecting the flow vectors onto the counting direction (4) and/or the counting section (6), and wherein a size of the partial value is determined depending on the subsection covered and/or a size of the segment of the object to be counted.

2. The device (1) according to claim 1, wherein the counting module (9) sums a partial value for each new and/or updated flow field having a moving image region that corresponds to an object to be counted.

3. The device (1) according to claim 1, wherein the objects to be counted are non-individualized and/or untracked and/or anonymized.

4. The device (1) according to claim 1, further comprising a segmenting module (12) which segments the moving image regions and/or the flow regions into object regions.

5. The device (1) according to claim 4, further comprising an object identification device (13) which identifies the object class of the segmented object regions.

6. The device (1) according to claim 4, wherein the subsection is assigned to one of the segmented object regions.

7. A method, implemented by a device including a memory, for counting objects in a surveillance region in a counting direction (4) along a counting section (6), the method comprising the steps of:

increasing an object counter by one counting value when one of the objects, as the object to be counted, completely passes through the counting section (6) in the counting direction (4), extracting moving image regions from a current image of the surveillance region including determining an optical flow field having flow vectors, defining a length for the counting section (6), which the corresponding object must cover between entering and exiting a region of an image to be counted, increasing the object counter by a partial value for the current image for one of the moving image regions, where a direction of motion thereof corresponds to a counting direction (4) and thus represents a potential object to be counted or a segment thereof, wherein the partial value is less than the one counting value, estimating a subsection of the length that the corresponding object to be counted has covered in the current image depending on the direction of motion or velocity of the moving image region by projecting the flow vectors onto the counting direction (4) and/or the counting section (6).

8. The method defined by claim 7, further comprising determining a size of the partial value based the subsection covered and/or a size of the segment of the object to be counted.

9. A computer program product comprising program code means, which program code means is stored on a non-transitory computer-readable data carrier and performs all steps of the method according to claim 7, when the program code means is run on a computer and/or the device (1).

* * * * *